A. A. LOW.

Type Case.

No. 9,720. Reissued May 24, 1881.

Witnesses

William Miller

Otto Hufeland

Inventor

Abbot Augustus Low.

by Van Santvoord & Hauff.

his attorneys

UNITED STATES PATENT OFFICE.

ABBOT A. LOW, OF BROOKLYN, ASSIGNOR TO THE ALDEN TYPE MACHINE COMPANY, OF NEW YORK, N. Y.

TYPE-CASE.

SPECIFICATION forming part of Reissued Letters Patent No. 9,720, dated May 24, 1881.

Original No. 233,264, dated October 12, 1880. Application for reissue filed February 4, 1881.

*To all whom it may concern:*

Be it known that I, ABBOT AUGUSTUS LOW, a citizen of the United States, residing at Brooklyn, in the county of Kings and State of New York, have invented a new and useful Improvement in Type-Cases, of which the following is a specification.

My invention relates to type cases or channels for setting-machines and distributing-machines, and especially that class of machines shown and described, for example, in the Patents of Augustus C. Richards, Nos. 212,503 and 212,504, dated February 18, 1879.

Prior to my invention these type-cases were constructed with plain edges, and in order to retain the type therein it was necessary to place the cases in an inclined position in both machines. This is objectionable, particularly in setting-machines in which the types discharge from the cases at their lower ends because the types drag against the backs of the cases, and are thus retarded and liable to be thrown out of line, while they are also exposed to wear. To overcome this objection I construct each of the type-cases with a longitudinal inwardly-projecting rib or flange on the front edge of one of its sides, said rib or flange being at the same point in all the cases, and adapted to engage with coincident bearings or shoulders formed on the types of different faces introduced into the case, so that while the types are allowed the required longitudinal movement they are effectually retained in the case in any position thereof. The engagement of the rib or flange with the types is effected by means of coincident nicks in the various types.

It also consists in beveling the back of the type-case on its inner surface and in the direction of the side having the longitudinal rib or flange, so that the types have a tendency to shift or lean toward the rib or flange, and its engagement with the types is insured.

Figure 1:
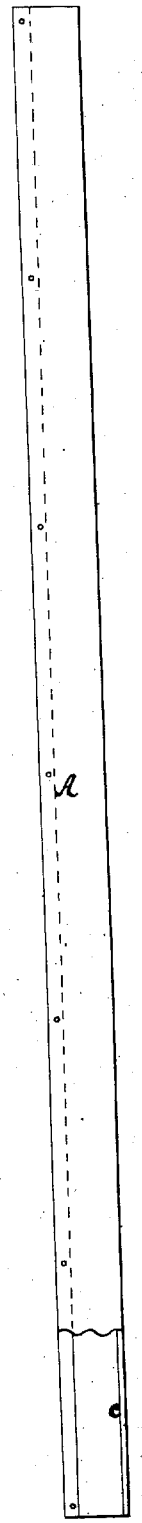
Figure 2:
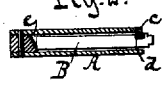

This invention is illustrated in the accompanying drawings, in which Figure 1 is a side view, partly in section. Fig. 2 is a cross-section.

Similar letters indicate corresponding parts.

The letter A designates the body of the type-case, open at its opposite ends and on one side, which latter constitutes the front of the case.

B, Fig. 2, designates one of the types, and *c* the longitudinal inwardly-projecting rib or flange of the type-case. This rib or flange *c* is situated at the front edge of one side of the type-case, and is formed by bending such edge; but, if desired, the rib or flange may be arranged intermediate of the front and back of the case, and may be formed of a strip secured at the desired spot. The simpler method, however, is to put the rib or flange on the front edge of the case, inasmuch as that edge is free and can be readily got at.

The letter *d* indicates a nick formed in the edge of the types at such a part thereof that when the types are introduced into the case A the rib or flange *c* engages the types by entering such nick. In this manner the types are effectually retained in the case without any interference with their longitudinal movement.

The letter *e*, Fig. 2, designates the bevel on the inner surface of the back of the type-case. The direction of this bevel is toward the side of the case having the rib *c*, and by its means the types are left destitute of a support against the back next to such side, the effect of which is to give the types a tendency to lean toward the rib, thereby insuring its engagement with the types.

I am aware that in type setting and distributing machines the types have been held in position by vertical rods fitting in dovetail notches in their edges; also, that type-cases have been provided with ribs which are in different positions in cases for different letters or characters, and I do not claim such; but

What I claim as new, and desire to secure by Letters Patent, is—

1. As a new article of manufacture, a type-case having a longitudinal inwardly-projecting rib or flange on the front edge of its side, substantially as herein shown and described.

2. A type-case provided with a longitudinal inwardly-projecting rib or flange on the front edge of one of its sides, adapted to engage with coincident bearings or shoulders formed on the types of various faces introduced into such case, substantially as and for the purpose described.

3. A type-case constructed with an internal longitudinal rib on one of its sides, adapted to engage with coincident bearings or shoulders formed on the various types of different faces of a font, substantially as and for the purpose described.

4. A type-case which is constructed with a longitudinal rib or flange, for the purpose set forth, on one of its sides, and the back of which is beveled in the direction of the side having such rib, substantially as described.

ABBOT AUGUSTUS LOW.

Witnesses:
W. HAUFF,
CHAS. WAHLERS.